July 7, 1925.  W. H. B. PERRY  1,545,448
SAW TOOTH
Filed June 14, 1924
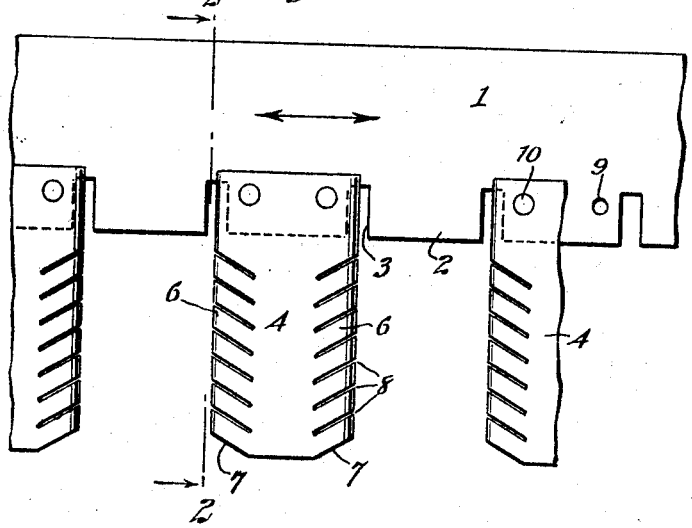
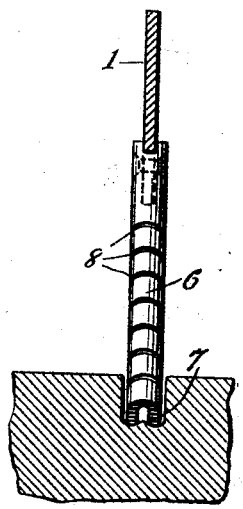
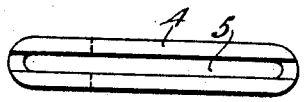
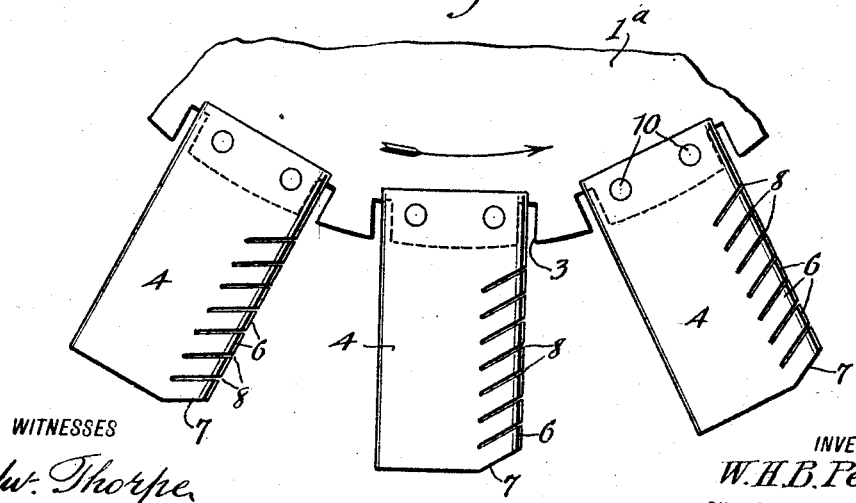
WITNESSES
Edw. Thorpe
Robert J. Hulzizer
INVENTOR
W. H. B. Perry
BY Munn & Co.
ATTORNEYS

Patented July 7, 1925.  1,545,448

UNITED STATES PATENT OFFICE.

WILLIAM H. B. PERRY, OF WATERBURY, VERMONT.

SAW TOOTH.

Application filed June 14, 1924. Serial No. 720,014.

*To all whom it may concern:*

Be it known that I, WILLIAM H. B. PERRY, a citizen of the United States, and a resident of Waterbury, in the county of Washington and State of Vermont, have invented a new and Improved Saw Tooth, of which the following is a full, clear, and exact description.

This invention relates to an improvement in saw teeth, with particular reference to teeth for use in stone-cutting apparatus.

An object of the invention is to provide a simple, efficient, strong and durable tooth construction which is capable of ready attachment to and detachment from a saw blade of any type.

Another object concerns the provision of means whereby the teeth do not have to be replaced at nearly such frequent intervals as has been the case because of the automatic action of the tooth itself in furnishing a fresh cutting edge when one cutting edge has worn out.

A further object concerns the provision of means whereby the cutting action is rendered more efficient and rapid by reason of the provision of a plurality of cutting surfaces.

The invention is illustrated in the drawings, of which—

Figure 1 is a side elevation of a portion of a saw blade showing certain teeth attached thereto;

Fig. 2 is a section taken on the line 2—2 of Fig. 1;

Fig. 3 is a plan view of one of the teeth; and

Fig. 4 is a partial elevation of a modified form of plate.

The form of the invention shown in the drawings is a preferred form, although it is understood that modifications in the construction and arrangement of the parts and in the character of the materials used may be adopted without departing from the spirit of the invention as set forth in the appended claims.

The invention in its general aspects concerns the provision of a tooth, preferably hollow and elongated in cross section, which is provided with a cutting edge, preferably along one edge but possibly provided with cutting edges at both the front and rear, this tooth being slotted at intervals through either or both cutting faces so that as the cutting edge wears away the edge adjacent the nearest slot will break off, presenting a fresh cutting edge, which in turn will gradually wear away and break off, so that successive cutting edges are freshly presented, thus not requiring the replacement of a new tooth every time the cutting edge becomes useless.

A further aspect of the invention concerns the provision of a plurality of projecting lugs or teeth on the saw blade which are adapted to be inserted into the end of the hollow cutting tooth and, by reason of aligning apertures in the teeth, can be riveted together or otherwise fastened.

A still further aspect of the invention concerns that fact that by reason of the hollowness of the tooth two cutting edges are presented which wear into the stone along spaced lines between which on the stone a ridge of material is formed which gradually crumbles away due to the vibration. This permits a wider cut to be made with a minimum amount of cutting edge and in the same period of time.

Furthermore, the invention is susceptible of providing a tooth both front and rear faces of which can be provided throughout their length with spaced slits to form tongues which, as they are gradually worn away by the cutting action, will break off. Furthermore, the fact that the tooth is hollow enables it to be fastened readily to the saw blade to provide an efficient cutting surface and at the same time remains light in weight so that higher speeds are possible than with a solid tooth.

In the preferred form of the invention shown in the drawings 1 or 1ª represents the body of the saw blade, which may be a straight blade or a curved blade. This blade is provided throughout its periphery with a plurality of projections or teeth such as 2 between which slots 3 are formed.

The cutting teeth are designated by the numeral 4 and are preferably hollow, having preferably an elongated elliptical cross section, as shown in Fig. 3, the lateral walls of the tooth being separated by a hollow space 5.

Along either the front or the rear face, or both, of the tooth a plurality of tongues 6 may be formed, these tongues produced by slitting the tooth at spaced distances along its length from the cutting edge 7, either at the front or rear or both. These slits are designated by the numeral 8. Preferably the slots are disposed parallel to the angle of the cutting edge 7 so that as the first and lowermost tongue wears away it will break off during the operation of the machine and a new cutting edge will be presented.

The teeth or projections 2 are provided with apertures 9 which are adapted to be aligned with apertures in the teeth 4 so that rivets or other fastening means such as 10 can hold the tooth to the projection when the tooth is slipped on to the projection. By this means of connection teeth can be readily attached to and detached from the blade either of the straight or rotary type.

As shown in Fig. 2, the spaced walls of the tooth as they cut along the edges 7 will result in a ridge being formed between them in the stone at the bottom of the cut. However, this ridge will crumble or break down, due to the rapid vibration to which the stone is subjected, so that with only the two thin cutting walls spaced apart a wider cut can be made in the same time. By having the slits provided on both the front and rear faces of the tooth, especially shown in Fig. 1, the saw blade can be moved in either direction. This same construction, of course, is applicable to the teeth as applied to a rotary blade.

It is obvious that I have provided a simple and efficient form of tooth and a particularly simple manner for attaching it to a blade whereby it can be readily attached and detached. This tooth is especially efficient with regard to the size and speed of cutting and with regard to the length of time during which it can be used without replacement.

What I claim is:—

1. A saw tooth having a cutting edge and a cutting face, said tooth being provided with a plurality of slits along its cutting face.

2. A saw tooth having a cutting edge and a cutting face, said tooth being provided with a plurality of slits along its cutting face and said slits being disposed at spaced intervals and parallel to the cutting edge.

3. In combination, a saw blade having a plurality of projections, hollow saw teeth each adapted to have one end slipped over a projection, and means for fastening the teeth to the projections.

4. In combination, a saw blade having an elongated projection, a hollow tooth having a similar elongated cross section adapted to be slipped over the projection, and means for fastening the tooth to the projection.

5. A saw tooth having an elongated elliptical cross section and front and rear faces, said tooth having a plurality of slits disposed at spaced intervals throughout the length of each face.

6. A saw tooth having an elongated elliptical cross section and front and rear faces, said tooth having a plurality of slits disposed at spaced intervals throughout the length of each face, said slits being arranged at spaced intervals and parallel to the cutting edge at the bottom of each face.

WILLIAM H. B. PERRY.